(12) United States Patent
Craen et al.

(10) Patent No.: US 7,573,646 B2
(45) Date of Patent: Aug. 11, 2009

(54) LIQUID LENS INTERCONNECTION

(75) Inventors: Pierre Craen, Lyons (FR); Christophe Leclerc, Lyons (FR); David Perennez, Lyons (FR)

(73) Assignee: Varioptic S.A., Lyons (FR)

( * ) Notice: Subject to any disclaimer, the term of this patent is extended or adjusted under 35 U.S.C. 154(b) by 0 days.

(21) Appl. No.: 11/776,173

(22) Filed: Jul. 11, 2007

(65) Prior Publication Data

US 2008/0013187 A1    Jan. 17, 2008

(30) Foreign Application Priority Data

Jul. 12, 2006   (EP)   .................. 06300804

(51) Int. Cl.
  *G02B 9/00*   (2006.01)
  *G02B 21/02*  (2006.01)
(52) U.S. Cl. ....................... 359/665; 359/666
(58) Field of Classification Search ............. 359/665, 359/666
  See application file for complete search history.

(56) References Cited

U.S. PATENT DOCUMENTS

| | | | |
|---|---|---|---|
| 6,369,954 B1 | 4/2002 | Berge et al. | |
| 7,245,440 B2 | 7/2007 | Peseux | |
| 2005/0199725 A1* | 9/2005 | Craen et al. | 235/462.22 |
| 2005/0200973 A1* | 9/2005 | Kogo et al. | 359/689 |
| 2006/0126190 A1* | 6/2006 | Berge et al. | 359/665 |
| 2007/0002455 A1 | 1/2007 | Berge et al. | |
| 2007/0177276 A1 | 8/2007 | Liogier D'ardhuy et al. | |
| 2007/0179201 A1 | 8/2007 | Maillard et al. | |

FOREIGN PATENT DOCUMENTS

| | | |
|---|---|---|
| EP | 1 166 157 B1 | 1/2002 |
| EP | 1 662 276 A1 | 5/2006 |
| EP | 1 736 802 A2 | 12/2006 |
| EP | 1 798 578 A1 | 6/2007 |
| EP | 1 801 622 A1 | 6/2007 |
| WO | WO 2005/073761 A1 | 8/2005 |
| WO | WO 2005/073779 A1 | 8/2005 |
| WO | WO 2006/027522 A1 | 3/2006 |
| WO | WO 2006/103281 A1 | 10/2006 |
| WO | WO 2006/103290 A1 | 10/2006 |
| WO | WO 2006/136612 A1 | 12/2006 |
| WO | WO 2006/136613 A1 | 12/2006 |
| WO | WO 2007/068761 A1 | 6/2007 |
| WO | WO 2007/085658 A1 | 8/2007 |
| WO | WO 2007/107517 A1 | 9/2007 |
| WO | WO 2007/107589 A1 | 9/2007 |
| WO | WO 2007/113637 A1 | 10/2007 |
| WO | WO 2007/147863 A1 | 12/2007 |

* cited by examiner

*Primary Examiner*—Jordan M. Schwartz
*Assistant Examiner*—James C Jones
(74) *Attorney, Agent, or Firm*—Osha • Liang LLP (57) ABSTRACT

The invention relates to a lens housing with a wall, including a contact surface arranged for contact with a support, a first region for receiving an electrowetting optical device comprising a cavity containing first and second liquids, the curvature of an interface between said first and second liquids being controllable by electrowetting by application of a voltage between first and second electrodes of said device, and a second region for receiving one or more fixed lenses, the second region being positioned between said contact surface and said first region, wherein said lens housing further comprises first and second conducting tracks integrated with said wall, said conducting tracks extending between said contact surface and said first region and arranged to make electrical contact with said first and second electrodes, respectively.

18 Claims, 6 Drawing Sheets

LIQUID LENS INTERCONNECTION

FIELD OF THE INVENTION

The present invention relates to a housing for an electrowetting device, and in particular to a housing for a variable focus liquid lens, the focus being variable by electrowetting.

BACKGROUND OF THE INVENTION

Figure 1:
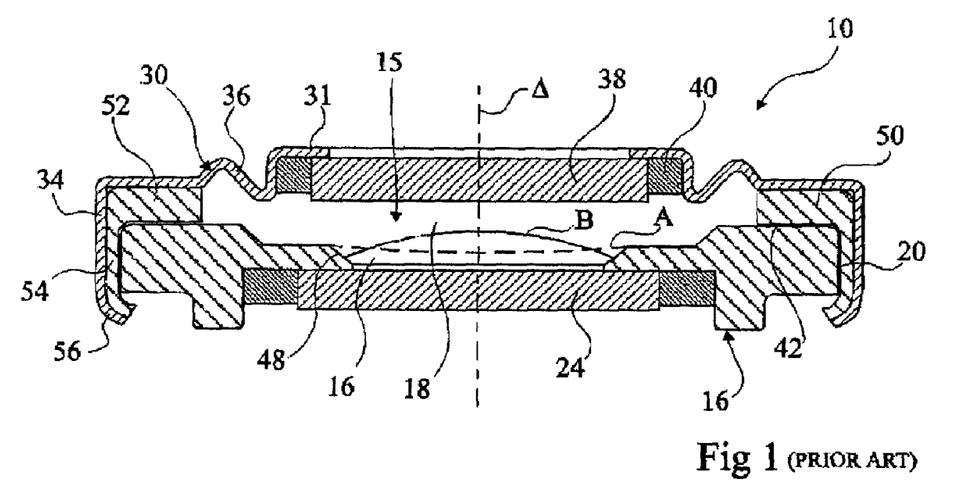
FIG. 1 (described above) illustrates an embodiment of a liquid lens comprising liquids movable with respect with each other by electrowetting.

Variable focus liquid lenses are known in the art. Such lenses generally comprise a refractive interface between first and second immiscible liquids that is moveable by electrowetting. FIG. 1 reproduces FIG. 4 of European Patent Application EP1662276, and illustrates a known variable focal length lens 10. Lens 10 comprises two transparent windows 24, 38 facing each other and parallel to one another, and delimiting, at least in part, an internal volume 15 containing two immiscible liquids 16, 18, with different optical indices, defining an optical interface A, B in the form of a meniscus where they meet. The liquids 16, 18 have substantially equal densities, and one is preferably an insulating liquid, for example comprising oil or an oily substance, and the other is preferably a conducting liquid comprising for example an aqueous solution. The windows are for example transparent plates, made of an optical transparent material, e.g. glass. Whilst planar windows are shown, these windows could be fixed lens, centred on an optical axis ($\Delta$) of the variable focus lens 10.

Lens 10 further comprises a cap 30 connected to transparent window 38 and comprising a first cylindrical side wall 34. Lens 10 also comprises a body 16 having a symmetry of revolution about the optical axis ($\Delta$) of the lens. Body 16 is connected to transparent window 24 and comprises a second cylindrical side wall 20 of a diameter smaller than the diameter of the first cylindrical wall. Cap 30 forms a first electrode and body 16 comprises a second electrode. A gasket 50 is provided to ensure the tightness of the lens structure, positioned such that it is compressed between the first and second cylindrical side walls. In particular, gasket 50 is substantially "L"-shaped in cross-section, comprising a portion 54 compressed between the first and second cylindrical side walls and a portion 52 compressed between the cap and a top surface 42 of body 12, the top surface 42 comprising an opening defining a conical or cylindrical surface 48 where the interface between the two liquids is able to move.

The lens further comprises deforming portions 36 arranged to deform in response to a change in pressure of the liquids. The deforming portions for example comprise corrugated regions 36 formed in the upper wall 31 of the cap, the deforming portions having symmetry of revolution about the optical axis ($\Delta$) of the lens. For example, the deforming portions comprise at least one circular ripple centred on the optical axis ($\Delta$) of the lens. In this example the cap is for example made of a stamped metal, pressed into shape, e.g. stamped stainless steel. The thickness of the upper wall of the cap will depend on the expected variations of volume to compensate for the effects of expansion of the liquids. For example, a typical thickness of about 0.1 to 0.25 mm has shown good results for lenses whose outer diameters is below 20 mm.

Side wall 34 of the cap comprises a rim 56 crimped onto the body 16, which deforms the gasket 50 between the cap and a corner of body 16, and seals the cap and the body. Other methods for sealing the cap onto the body are possible, for example it would be possible to glue the cap onto the body.

Due to the electrowetting effect, it is possible, by applying a voltage between the cap 30 and base 16, to change the curvature of the refractive interface between the first liquid 106 and the second liquid 108, for example, from an initial concave shape as shown by dashed line A, to a convex shape as shown by solid line B. Thus rays of light passing through the cell perpendicular to the windows 24, 38 in the region of the refractive interface A, B will be focused more or less depending on the voltage applied.

When a variable focus liquid device, for example the device of FIG. 1, is to be mounted in a digital camera, mobile phone or the like, it is necessary to connect the electrodes of the variable lens to driving circuitry that provides the appropriate drive voltages to control the lens. Depending on the positioning of the variable lens with respect to the driving circuitry, a relatively significant gap is required to be bridged to make this connection. Whilst flexible conducting wires could be used to connect the electrodes of the lens to the drive circuitry, these are disadvantageous as they are bulky, and can cause interference with other components close by. There is thus a need for a low cost interconnection that requires minimal space and causes little or no interference with nearby components.

SUMMARY OF THE INVENTION

It is one object of the present invention to provide an electrowetting device and method for manufacturing the same which at least partially addresses the needs described above.

According to a first aspect of the present invention there is provided a lens housing comprising a wall comprising: a contact surface arranged for contact with a support; a first region for receiving an electrowetting optical device comprising a cavity containing first and second liquids, the curvature of an interface between said first and second liquids being controllable by electrowetting by application of a voltage between first and second electrodes of said device; and a second region for receiving one or more fixed lenses, the second region being positioned between said contact surface and said first region; wherein said lens housing further comprises first and second conducting tracks integrated with said wall, said conducting tracks extending between said contact surface and said first region and arranged to make electrical contact with respective ones of said first and second electrodes of said electrowetting optical device when said electrowetting optical device is positioned within said first region.

According to a further aspect of the present invention, a lens system is provided comprising the above lens housing; said electrowetting optical device mounted within said housing; and at least one fixed lens mounted within said lens housing.

According to a further aspect of the present invention, there is provide a camera module comprising the above lens system mounted on a circuit board, and drive circuitry mounted on said circuit board, connected to said first and second tracks and arranged to generate drive signals for driving said variable focus liquid lens.

According to yet a further aspect of the present invention, there is provided a method of manufacturing an electrowetting optical device for mounting in the above lens housing, the method comprising forming an annular electrode having an annular foot; shielding a surface of said annular foot which is to contact a conducting track of the lens housing; and coating surfaces of said annular electrode, except for said shielded surface, with a layer of an insulating material.

Further objects, features and advantages of the present invention will become apparent from the following detailed description of exemplary preferred embodiments, when considered together with the accompanying figures of drawing.

BRIEF DESCRIPTION OF THE DRAWINGS

In the drawings.

For clarity, throughout the figures, like reference numbers have been used for corresponding features. The figures are not drawn to scale.

DETAILED DESCRIPTION OF THE INVENTION

Figure 2:
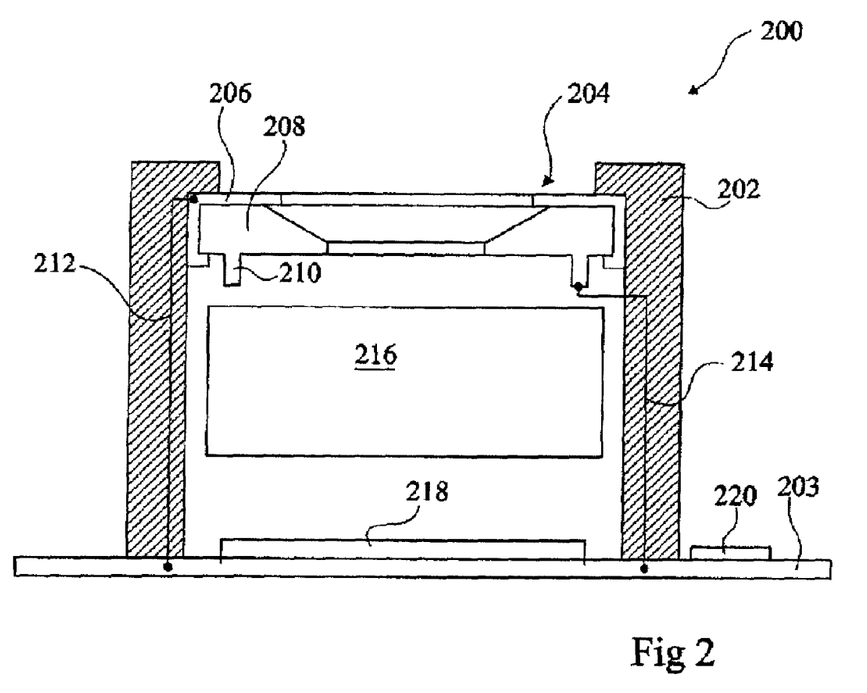
FIG. 2 illustrates a camera module according to a first embodiment of the invention.

With reference to FIG. 2, a camera module 200 is shown in cross-section. Camera module 200 comprises a lens housing 202, which is for example a cylindrical component arranged to be mounted on a flat support 203, for example a PCB (printed circuit board). The lens housing 202 houses a number of lenses. In particular, a variable focus liquid lens 204 is positioned within the lens housing 202. Variable lens 204 is for example a liquid lens as described above in relation to FIG. 1 or as described in the corresponding European Patent Application EP 1662276, or for example as more generally described in European Patent No. EP1166157 or co-pending European applications 05112671 and 05112056.

In the present example the liquid lens is positioned in the lens housing 202 at the opposite end to the support 203, however in alternative embodiments other positions are possible. The liquid lens 204 comprises two electrodes, labelled 206 and 208. Electrode 206 is preferably part of a cap portion of the liquid lens 204 and electrode 208 is preferably an annular electrode having an annular foot 210 that extends from the underside of the lens.

Providing a contact surface on an annular foot 210, contact with a corresponding conducting track is made easier. The surfaces of annular electrode 208 are preferably coated by an insulating layer preventing contact with the liquids in the lens, or with the cap. During manufacture of lens 204, the contact surface of the annular foot 210 for contact with the conducting track can be exposed by placing the annular electrode 208 on a flat surface before the insulating coating is applied. The bottom surface of the annular foot 210 is thus shielded, and will not be coated by the insulating layer.

A first conducting track 212, comprising, for example, a metal such as copper, extends from support 203 within the wall of the lens housing 202 to the level of the liquid lens 204, where it makes contact with electrode 206. A second conducting track 214, also comprising, for example, a metal such as copper, extends from support 203 to the liquid lens 204 within the wall of the lens housing 202 but in a different region from track 212. Conducting track 214 makes contact with annular foot 210. Conductive tracks 212, 214 thus provide a connection between the liquid lens 204 and circuitry on the support 203 for driving the liquid lens.

A number of fixed lenses 216 are provided in the lens housing 202, between the variable lens 206 and the support 203. An image sensor 218 is preferably mounted on the support 203, and lens housing 202 is mounted over this image sensor 218 such that images received via the liquid lens 204 are focused on the image sensor 218 and can be thus captured. Driving circuitry 220 is preferably mounted on support 203 for providing drive signals for driving the liquid lens 204.

A number of possible embodiments of the lens housing 202, and in particular the connecting tracks 212, 214 provided in the lens housing 202, will now be described with reference to FIGS. 3 to 7. It should be noted that the embodiments shown in these figures and described below are by way of illustration only, and should not be construed in any way to limit the scope of the invention. Throughout the description, relative terms such as "underside", "top surface", "top end" and "bottom end" that depend on the particular orientation of the lens housing apply when the lens housing is orientated as shown in the figures, in other words with the housing of the lens arranged substantially vertically, with the end for connecting to a support or similar substrate facing downwards, and the opposite end that receives a light image facing upwards. Terms such as "inner" and "outer" are generally used to mean radially inwards towards the centre of the housing, or outwards away from the centre of the housing, respectively.

Figure 3A:
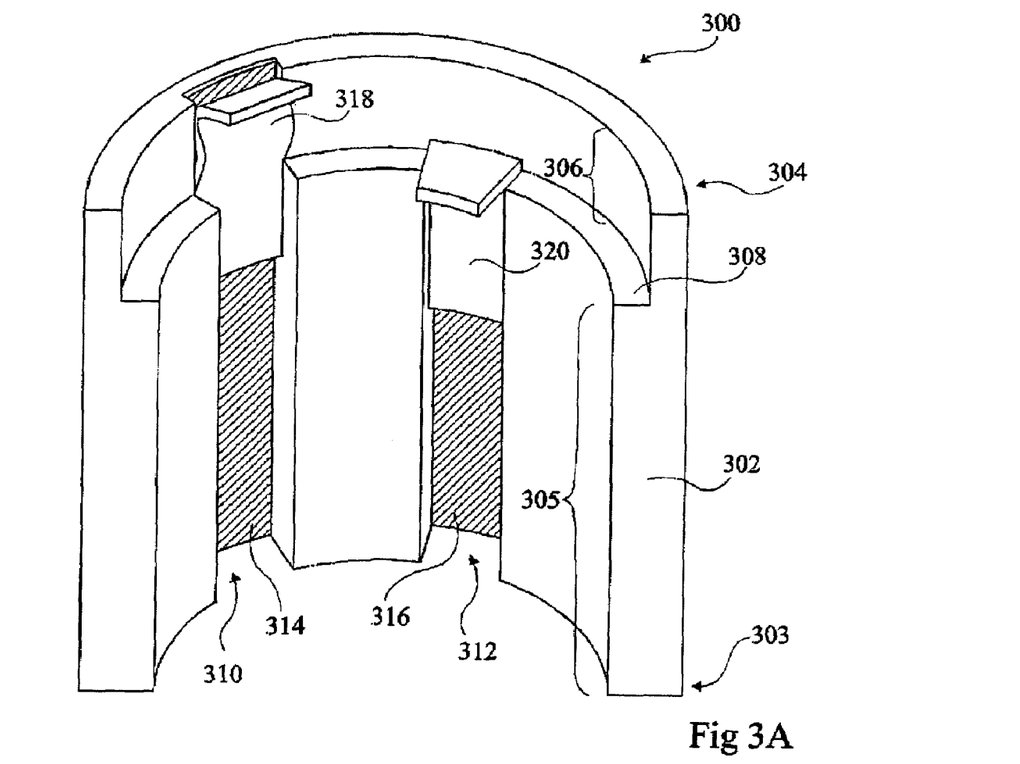
FIGS. 3A, 3B and 3C illustrate a lens housing according to a first embodiment of the invention.

FIG. 3A illustrates a first embodiment 300 of a lens housing. The lens housing 300 comprises a wall 302 which is preferably cylindrical and formed for example of a plastic. A bottom end 303 of the lens housing 300 is arranged to be mounted to a support, and a top end 304 of the lens housing 300 is arranged to receive a liquid lens. The outer surface of wall 302 has a uniform diameter, whereas the inner surface comprises a region 305 extending from the bottom end 303 of the lens housing 300 to approximately three-quarters of the way up the lens housing in which the housing is narrower, having a smaller diameter, than a region 306 extending from region 305 to the top end 304 of the lens housing 300 which is wider having a larger diameter. There is thus an annular shoulder 308 between regions 305 and 306, shoulder 308 comprising a flat annular surface on a plane perpendicular to the axis of the cylindrical wall 302.

Two separate narrow rectangular grooves 310, 312 are formed in the inner surface of the wall 302, each extending from the bottom end 303 up the inner surface of wall 302 towards top end 304. Groove 310 preferably extends substantially vertically from the bottom end 303 to the top end 304 of the lens housing 300. Groove 312 preferably extends substantially vertically from the bottom end 303 of the lens housing 300 to shoulder 308. Each groove 310, 312 has a back surface facing the axis of the cylindrical wall 302, and side surfaces perpendicular to the back surface. Thin conducting layers 314, 316 are formed covering the back surface of the first and second grooves 310, 312 respectively. For example, MID (multiple interconnected devices) technology could be used to form these tracks, such as a plastic galvanizing technique. Such a technique involves performing a special surface treatment to the back surfaces of these grooves 310, 312, or forming them of a different type of plastic to the rest of the wall 302, and then immersing them in a chemical solution such that these areas are selectively plated with metal. The plastic of the back surface of grooves 310, 312 is for example particle charged, encouraging coating by metal particles.

Metal contacts 318 and 320 are preferably provided for making contact between the conducting layers 314, 316 respectively, and the liquid lens, to provide a conducting track from the bottom end 303 of housing 300 and the electrodes of a liquid lens when placed in position. These metal contacts 318, 320 are shaped based on the positioning of the electrodes of the liquid lens. Each is preferably made from a flat piece of metal stamped or pressed into shape. These metal contacts 318, 320 will now be described in more detail with reference to FIGS. 3B and 3C.

Figure 3B:
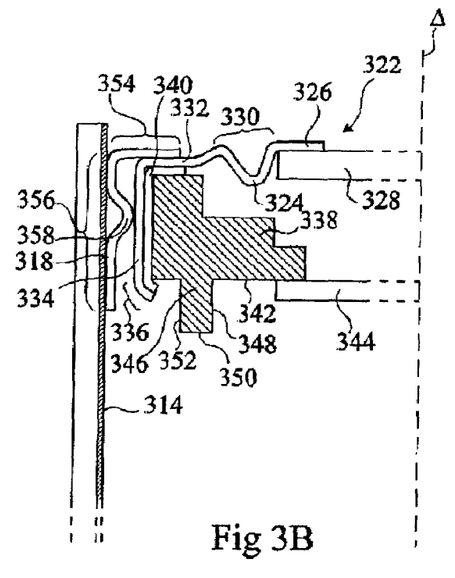

FIG. 3B shows a cross-section view of the part of lens housing 300 comprising metal contact 318, in a plane comprising the axis of the lens housing and passing through groove 310. In particular, FIG. 3B illustrates the connection between metal contact 318 and the electrodes of a variable focus liquid lens 322 mounted in position in the second region 306 of the lens housing 300. Only the part of the lens housing between wall 302 and an optical axis Δ of the liquid lens is shown.

The liquid lens 322 is very similar to liquid lens 10 described above. In particular it comprises a metal cap 324 which also acts as one of the electrodes of the liquid lens. The metal cap 324 preferably comprises a sheet of metal pressed or machined into shape such that it is substantially rotationally symmetric to an optical axis Δ of the liquid lens, and preferably comprises an opening having an edge 326 for receiving a planar lens 328, a rippled portion 330 radially outwards of edge 326 for compensating for volume changes of the liquids in the lens, a top annular portion 332 substantially perpendicular to the optical axis Δ of the lens, and a side portion 334 substantially parallel to cylindrical wall 302, the bottom edge 336 of the side portion being crimped such that the cap 324 is fixed to a base portion 338 of the lens.

Base portion 338 of lens 322 comprises an annular electrode preferably formed of metal and separated from the cap portion 324 by an L-shaped gasket 340 that contacts portions 332 and 334 of cap 324. Base portion 338 comprises an opening in a region around the optical axis Δ of the lens having an edge 342 for receiving a further planar lens 344. The base portion 338 further comprises an annular foot 346 which is substantially rectangular in cross-section, having an inner surface 348 facing the optical axis Δ of the lens, an underside 350, and an outer surface 352 facing away from the lens away from the optical axis Δ.

In cross-section, metal contact 318 is preferably substantially L-shaped, and for example comprises a limb 354 that is flat and extends from conducting layer 314 towards the centre of the lens housing 300 in a plane substantially perpendicular to the axis of the cylindrical wall 302, the underside of limb 354 contacting the top portion 332 of the cap 324 and thus holding the liquid lens 322 in place. A further limb 356 preferably extends approximately parallel to the cylindrical wall 302, at least partially contacting conducting layer 314. Limb 356 preferably comprises a ripple 358 in which the metal contact extends towards the centre of the lens housing 300 and contacts the side portion 334 of lens 322, providing a further point of contact with cap 324. Ripple 358 also serves to tightly hold the liquid lens 322 in position and prevents lateral movement, or vertical movement of the lens.

When placed in the position in the lens housing 300, liquid lens 322 is preferably orientated such that the optical axis Δ is aligned with the axis of the inner surface of region 306 of wall 302. Ripple 358 serves to hold the liquid lens 322 in this position, such that there is a tight contact with the inner surface of region 306.

Figure 3C:
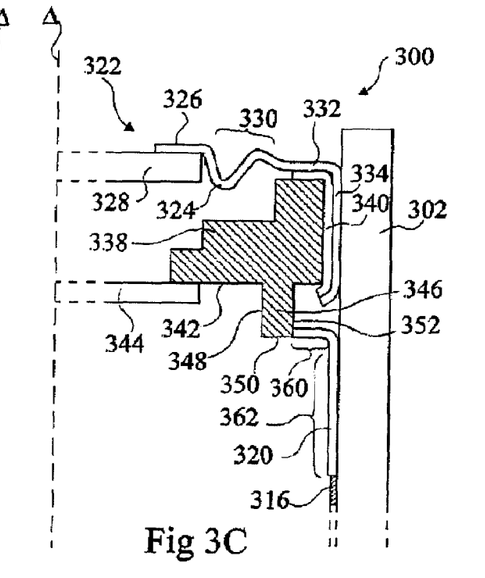

FIG. 3C shows the interconnection between metal contact 320 and the variable focus liquid lens 322 mounted in position in region 306 of the lens housing. FIG. 3C is a cross-section in a plane comprising the axis of the lens housing 300 and passing through the groove 312. In particular, metal contact 320 makes contact with the underside 350 of annular foot 346 of the base portion 338 of the lens.

In cross-section, metal contact 320 is substantially L-shaped, and for example comprises a limb 360 that is flat and extends from conducting layer 316 towards the centre of the lens housing 300 in a plane substantially perpendicular to the axis of the cylindrical wall 302, the top surface of limb 360 contacting the underside 350 of the annular foot 346. A further limb 362 preferably extends approximately parallel to the cylindrical wall 302, and contacts conducting layer 316.

Although not shown in FIGS. 3B and 3C, when placed in position, lens 322 rests on shoulder 308 of the lens housing, and in particular the bottom edge 336 of the side portion 334 of cap 324 rest on this shoulder 308.

Figure 4A:
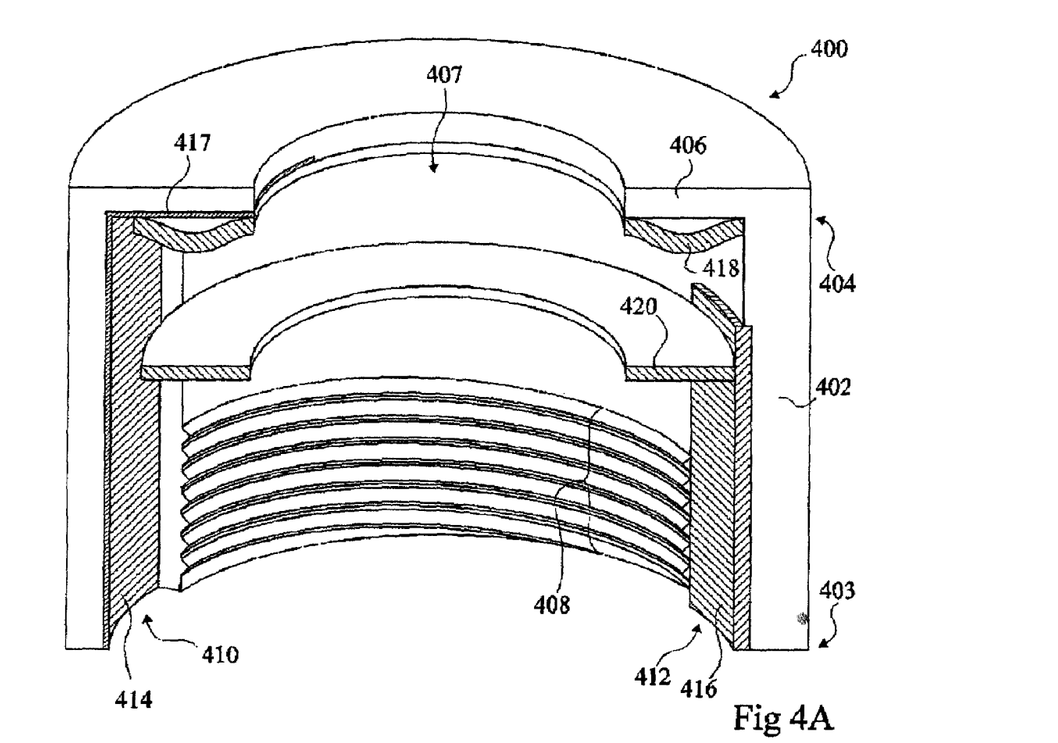
FIGS. 4A and 4B illustrate a lens housing according to a second embodiment of the invention.

FIG. 4A illustrates a lens housing 400 according to a second embodiment. Lens housing 400 comprises a wall 402 which is preferably cylindrical and arranged at a bottom end 403 to be mounted to a support, and comprises a lid portion 406 at a top end 404 of wall 402 that extends towards the centre of the lens housing 400 substantially perpendicular to the axis of cylindrical wall 402, and has an opening 407 for allowing light into the lens housing 400. The inner surface of wall 402 is preferably threaded in a region 408 between the bottom end 403 and approximately one third of the way up the lens housing, allowing a lens module containing fixed lenses to be screwed into place between the liquid lens and the support.

Lid 406 provides an economical way of holding lenses within the lens housing 400. In particular, lenses can be inserted into housing 400 via the bottom end 403, and pushed against lid 406. These are then held in place by screwing the lens module in position, before the lens housing is mounted on a support.

Narrow rectangular grooves 410, 412, are formed in the inner surface of wall 402, extending from the bottom end 403 towards the overhanging lid 406. Groove 410 extends all the way to lid portion 406, whereas groove 412 extends only approximately three quarters of the way up the lens housing 400. Rectangular conducting layers 414 and 416 are formed in each groove 410, 412 respectively, conducting layer 414 extending from the bottom end 403 to the underside of lid 406, and conducting layer 416 extending from the bottom end 403 to approximately three-quarters of the way up the lens housing 400. A further conducting layer 417 is formed in a region on the underside of the lid 406, arranged such that it contacts layer 414. Groove 410 is deeper than groove 412, groove 410 penetrating a distance into the side wall 402 of the lens housing, whereas groove 412 penetrates only slightly beyond the threading 408.

Annular contacts 418, 420 are provided for receiving the liquid lens, and in particular, these contacts are arranged to sandwich the liquid lens. Contact 418 is preferably formed of a disc-shaped metal ring having an outer diameter approximately equal to the inner diameter of wall 402, and having a bowed cross-section such that it is vertically springy. Contact 418 is positioned against the underside of lid 406, and contacts, at its radially inner and outer edges, the underside of lid 406 including the conducting layer 417. The middle region of the annular contact 418 however curves away from the underside of lid 406, this region being arranged to contact with an electrode of the liquid lens when positioned within the housing 400. Contact 420 is similar to contact 418, except that it is flat in cross-section. Contact 420 is positioned such that it contacts, at its outer edge, the upper end of conducting layer 416. Conducting layer 414, being in a deeper groove than conducting layer 416, is separated from annular contact 420.

Figure 4B:
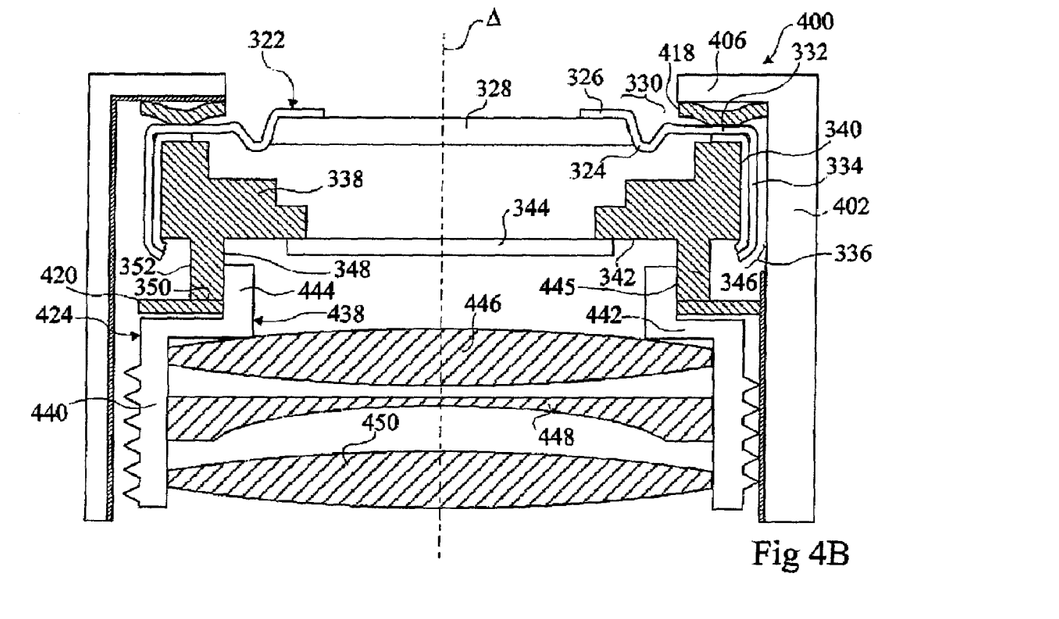

FIG. 4B illustrates a cross-section view of the lens housing 400 with liquid lens 322 and a lens module 424 inserted into position therein. The cross-section of FIG. 4B is through a plane comprising the axis of the lens housing and passing through grooves 410 and 412. Liquid lens 322 is the same liquid lens as described above in relation to FIG. 3B, and will not be described again in detail.

As shown, the annular contact 418, and in particular the lower tip of the curved region of annular contact 418, makes contact with the flat annular region of the top surface 332 of cap 426. Due to its curved region, contact 418 is springy, thereby ensuring good contact with surface 332 even if there is some movement of the liquid lens 322. Annular contact 420 makes contact with the underside 350 of the annular foot 346 of the base portion 338.

Lens module 424 preferably comprises a barrel 438, formed of plastic, comprising a cylindrical section 440 having an axis that is aligned with the optical axis Δ of the liquid lens 422, a flat annular lid 442 extending a short distance towards the optical axis Δ from section 440, and a further inner cylindrical section 444, extending from the inner edge of annular section 442 away from cylindrical section 440, and formed such that it is parallel to and aligned with the axis of cylindrical section 440, and thus the optical axis Δ of the liquid lens. The inner cylindrical section 444 has an outer annular surface 445 facing away from the centre of the lens housing 400.

A number of fixed lenses are positioned in the lens barrel 438 of the lens module 424, and in particular fitting tightly within the cylindrical section 440. In the example of FIG. 4B, these comprise a convex lens 446, a convex-concave lens 448 and a further convex lens 450. These lenses each have circular rims of a diameter that fits tightly within the cylindrical section 440 of the lens barrel 438. Furthermore, the outer surface 445 of cylindrical section 444 of lens barrel 438 is arranged to tightly fit into and contact with an inner surface 348 of the annular foot 346 of the liquid lens 322. In this way, the barrel 438 of the lens module 424 is aligned with the liquid lens 322, and in particular with the optical axis Δ of the liquid lens. Thus the fixed lenses 446 to 450 are aligned with optical axis Δ.

Figure 5A:
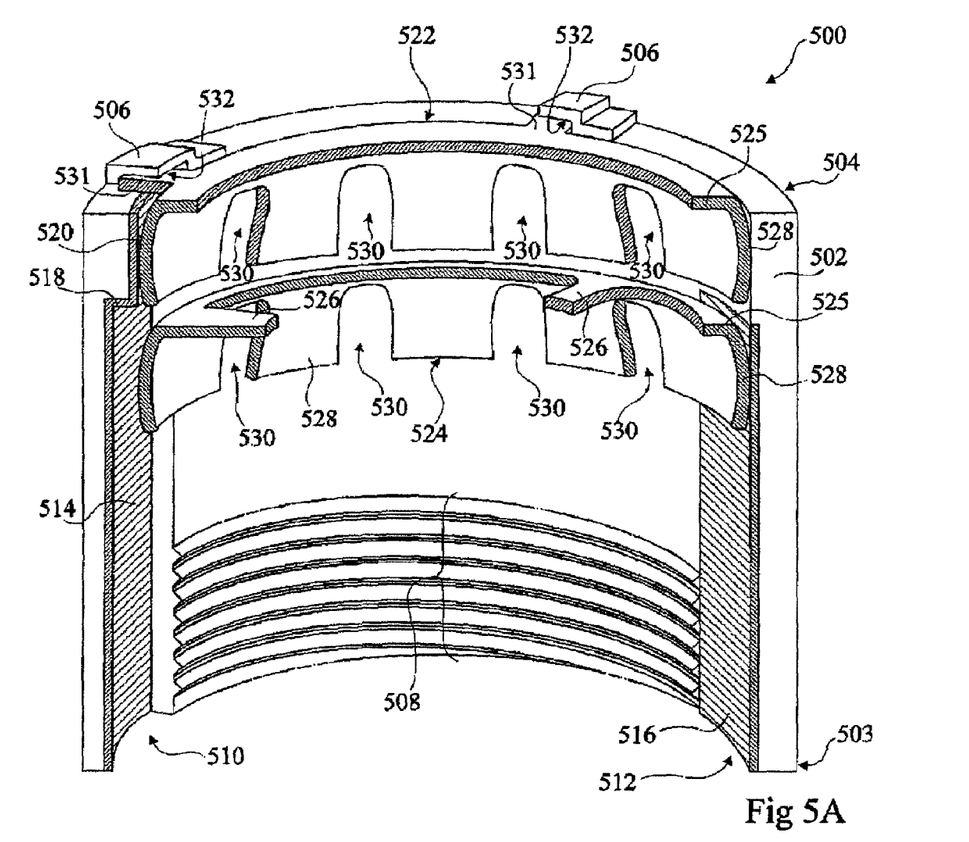
FIGS. 5A and 5B illustrate a lens housing according to a third embodiment of the invention.

FIG. 5A is a perspective view of a cross-section of a lens housing 500 according to a further embodiment. Lens housing 500 comprises a wall 502 which is preferably cylindrical and arranged at a bottom end 503 to be mounted to a flat support, and comprises, at a top end 504, a number of locking brackets 506. A lens barrel and a variable focus liquid lens can be inserted into the housing via the top end 504, and the variable focus lens can be locked in position with brackets 506 in order to keep the all the lenses in place, as will be described in more detail below.

The inner surface of the lens housing 500 is threaded in a region 508 between the bottom end 503 and approximately one third of the way up the lens housing, allowing a lens barrel containing fixed lenses to be screwed into place between the liquid lens and the support.

Narrow rectangular grooves 510, 512, are formed in the inner surface of wall 502, extending from the bottom end 503 approximately three quarters of the way up the lens housing 500. Rectangular conducting layers 514 and 516 are formed in each groove 510, 512 respectively, each layer 514, 516 also extending approximately three-quarters of the way up the lens housing 500. Groove 510 is deeper than groove 512. In particular, groove 510 penetrates a short distance into the side wall 502 of the lens housing 500, whereas groove 512 barely penetrates beyond the threading 508. Further conducting layer portions 518 and 520 are provided that extend conducting layer 514 to the lip 506. In particular layer 518 extends towards the centre of the lens housing 500 out of groove 510 to the level of the inner surface of the lens housing, and layer 520 extends from the upper edge of groove 510 to the lip 506.

Annular contacts 522, 524 are provided for receiving the liquid lens, and in particular, these contacts are arranged to sandwich the liquid lens. These contacts 522, 524 are different from the annular contacts 418, 420 of the previous embodiment. Each contact 522, 524 comprises a substantially annular body having a thin annular top surface 525 approximately perpendicular to the axis of the cylindrical wall 502 and curved side portions 528 arranged in a ring extending downwards from the top surface 525, in a direction parallel to the axis of the cylindrical wall. Slits 530 are provided between the side portions 528, each slit being arch-shaped and extending in a direction substantially parallel to the axis of the cylindrical wall 502. These slits allow the side portions 528 to be more easily curved and also to be slightly springy such that they apply a force to the inner surface of cylindrical wall 502. The size of the slit between each of the side portions 528 is narrower than the width of the conducting layers 514, 516, such that at least one of the curved side portions 528 of annular contact 522 contacts conducting layer 520, whilst at least one of the curved side portions 528 of annular contact 524 contacts conducting layer 516. Both of these contacts are improved by the springiness of the curved side portions 528.

Annular contact 522 in this embodiment forms a lid of the housing which not only serves to contact the cap electrode of a liquid lens, but also holds the liquid lens and lens module in position, and helps to center the liquid lens in the housing. Annular contact 522 in particular comprises a number of arms 531 extending from top surface 525 outwards from the center of cylindrical wall 502, at the level of the top end 504 of the cylindrical wall 502. These arms 531 interlock with brackets 506, and hold the annular contact 522 in position. More specifically, each bracket 506 comprises a slot 532 which receives a corresponding arm 531. Slots 532 are arranged such that arms 531 can be inserted by positioning annular contact 522 at the correct level, with arms 531 contacting the top edge of wall 502, and then rotating annular contact 522, in this case clockwise, about the axis of cylindrical wall 502, such that the arms 531 enter the slots 532 from one open side of each slot. Brackets 506 comprise an inner surface that contacts with the outwardly facing end surface of arms 531, thereby centering the annular contact 522 with the cylindrical wall 502 of housing 500.

Two arms 531 and corresponding brackets 506 are shown in the illustration of FIG. 5A, however this embodiment comprises a total of three such arms/brackets evenly spaced around the top end 504 of wall 502. In alternative embodiments, two or more than three such arms/brackets could be provided.

Annular contact 524 comprises a number of arms 526 extending inwards from top surface 525 towards the center of the cylindrical wall 502, these arms being provided for contacting with the annular foot of a liquid lens positioned within housing 400, as described in more detail below.

Figure 5B:
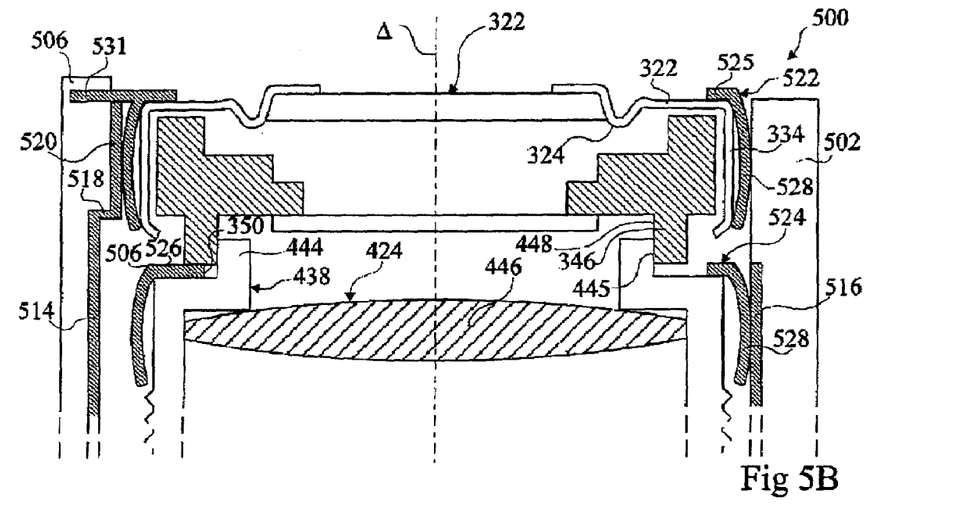

FIG. 5B is a cross-section view of the lens housing 500 with a liquid lens 322 and a lens module 424 positioned therein. The cross-section is taken in a plane comprising the axis of the lens housing and passing through grooves 510 and 512, and also through one of the arms 531 and corresponding bracket 506. Liquid lens 322 is identical to liquid lens 322 described above, and will not be described again in detail. Furthermore, the lens module 424 is identical to the lens module 424 of FIG. 4B, and will not be described again in detail.

Lens 322 comprises cap 324 having a top surface 332 that makes contact with the underside of the top surface 525 of annular contact 522. Curved side portions 528 of annular contact 522 are positioned adjacent to the side portion 334 of the liquid lens 322 and curve outwards to contact the inner surface of the wall 502, and in particular the conducting track 520. The underside 350 of annular foot 346 contacts the upper surface of arm 526 of the annular contact 524. The curved side portions 528 of annular contact 524 extend downwards adjacent to the cylindrical sides of the lens barrel 438 and curve outwardly such that they contact the inner surface of wall 502 and also the conducting layer 516.

As with the previous embodiment, the outer surface 445 of cylindrical section 444 of lens barrel 438 is arranged to tightly fit into and contact with an inner surface 448 of the annular foot 346 of the liquid lens 322. In this way, the barrel 438 of the lens module 424 is aligned with the liquid lens 322, and in particular with the optical axis Δ of the liquid lens. Thus the fixed lenses and liquid lens 322 are aligned.

Lens barrel 438 and liquid lens 322 are preferably assembled in housing 500 by initially fixing housing 500 to a support at end 503 and making the necessary electrical connections with tracks 514, 516, and then inserting the lens barrel 438 with fixed lenses via the top end 504 of the housing 500, inserting annular contact 524 over the lens barrel 438, positioning liquid lens 322 in position, and finally by inserting annular contact 522, and twisting annular contact 522 such that arms 531 are inserted into slots 532, holding the whole lens arrangement in place.

Figure 6A:
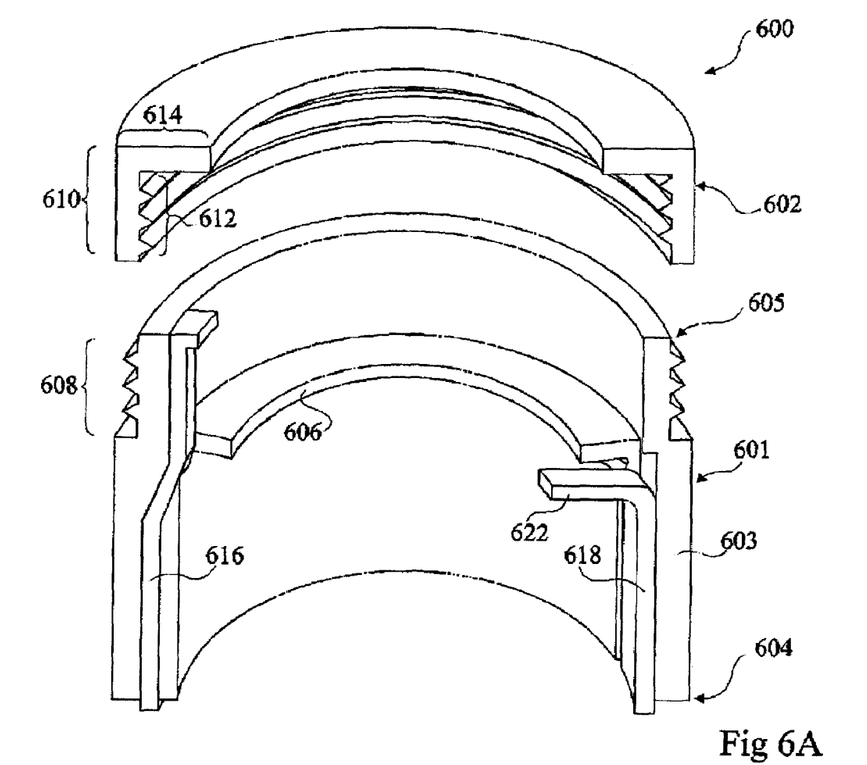
FIGS. 6A and 6B illustrate a lens housing according to a fourth embodiment of the invention.

FIG. 6A is a perspective view of a cross-section of a lens housing 600 according to a further embodiment. Lens housing 600 comprises a base 601 and a detachable lid 602. Base 601 comprises a wall 603 which is preferably cylindrical and arranged at a bottom end 604 to be mounted to a support, and at a top end 605 to receive a liquid lens.

An annular shelf 606 is preferably provided approximately three-quarters of the way up the inside of wall 603 for supporting the liquid lens. A region 608 on the outside surface of wall 603 extending from the top end 605 about a quarter of the way down the lens housing 600 in this example is threaded. Lid 602 is preferably annular in shape and comprises a cylindrical portion 610 having an inner surface 612 that is also preferably threaded such that lid 602 may be screwed onto region 608 of the base 601. Lid 602 also comprises a cap portion 614 extending from the cylindrical portion 610 towards the centre of the lid 602 perpendicular to the sides of the cylindrical portion, and having a circular opening for letting light into the lens. Thus when lid 602 is screwed onto the base 601, lenses within the lens housing are held in position.

Two conducting tracks 616 and 618 are provided, extending up the wall 603 of the base portion 601. Conducting track 616 preferably extends partway within the wall 603, and exits the wall level with shelf 606, and then extends adjacent to the inner surface of wall to the top of the wall. At the top of the housing 600, track 616 bends inwardly towards the center of the lens, to make contact with an electrode of the liquid lens when in position, as will be explained in more detail below. Conducting track 618 on the other hand is positioned within a groove formed in the inner surface of wall 603. Track 618 comprises an arm 622 extending towards the centre of the lens housing 600.

Figure 6B:
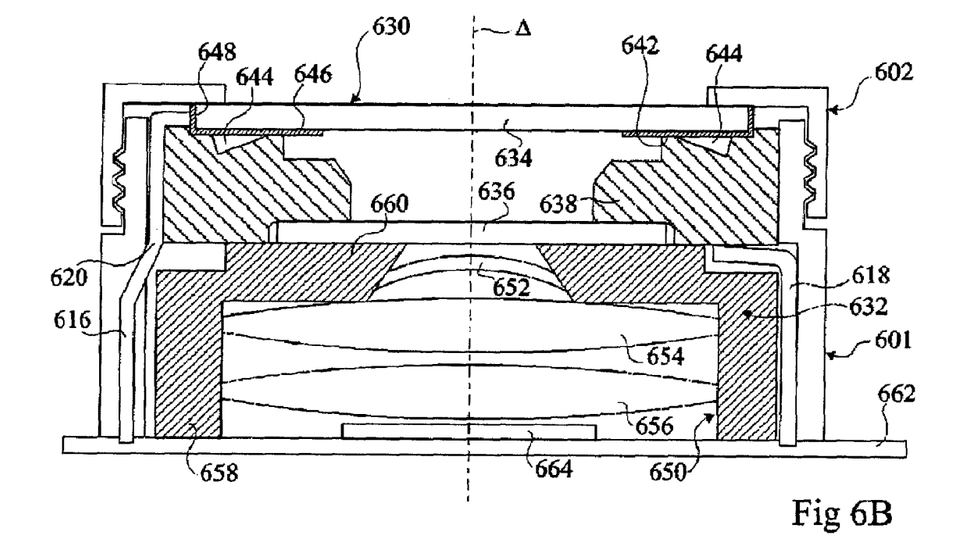

FIG. 6B is a cross-section view of the lens housing 600 with a liquid lens 630 and a lens module 632 mounted therein. The cross-section is taken in a plane comprising the axis of the lens housing 600, and passing through both tracks 616, 618.

Liquid lens 630 is slightly different from liquid lens 322 and has a three part structure comprising first and second transparent windows 634, 636, glued or directly sealed to a body 638. In this embodiment, body 638 forms one electrode of the lens, and comprises an annular metal piece, coated by an insulating layer on all its surfaces except for its annular bottom surface 640, which is exposed allowing contact with conducting track 618. The top surface 642 of body 638 is glued or otherwise sealed to window 634, and further comprises an annular expansion chamber 644 extending around the perimeter of the lens, and linked by a small channel (not shown) to the main cavity of the lens containing the conducting liquid and insulating liquid. The expansion chamber preferably contains a gas such as air, and allows for an expansion of the liquids in the lens caused by temperature variations. Alternative arrangements of the expansion chamber are possible, and are discussed in more detail in co-pending European Patent Application No. EP06115595, which is hereby incorporated by reference to the extent allowable by the law.

An annular electrode 646 is provided in the form of a conducting layer on a radially outer region of window 634 and contacts with the conducting liquid contained in lens. Electrode 646 extends to the edge 648 of window 634, where it exits the lens structure allowing conducting track 616 to make contact therewith.

The bottom surface 640 of lens 630 comprises a groove for receiving window 636. An annular opening through body 638 of the lens is similar to the opening through lens 322, and serves to provide a surface to which the edge of a refractive interface between the liquids in the lens is fixed, and in particular centers this interface in the lens.

Lens module 632 is similar to lens module 424 described above, and comprises a barrel 650 that houses fixed lenses 652, 654 and 656. In particular, a cylindrical portion 658 of barrel 650 has an inner diameter substantially equal to the diameter of the fixed convex lenses 654, 656, such that these lenses fit tightly within the cylindrical portion 658. Lens module 632 also comprises an annular disc-shaped portion 660 having a circular opening receiving concave-convex lens 652, the edges of the circular opening being inclined with respect to the optical axis of the lens.

Preferably, the base 601 of the lens housing 600 is mounted on a support 662, over and aligned with an image sensor 664, then lens module 632 and liquid lens 630 are placed in position in the housing 600, liquid lens 630 for example being tilted to pass the protruding end of contact 616, and finally the lid 602 is screwed in place to hold the liquid lens 630, and the lens module 632, in position.

Figure 7A:
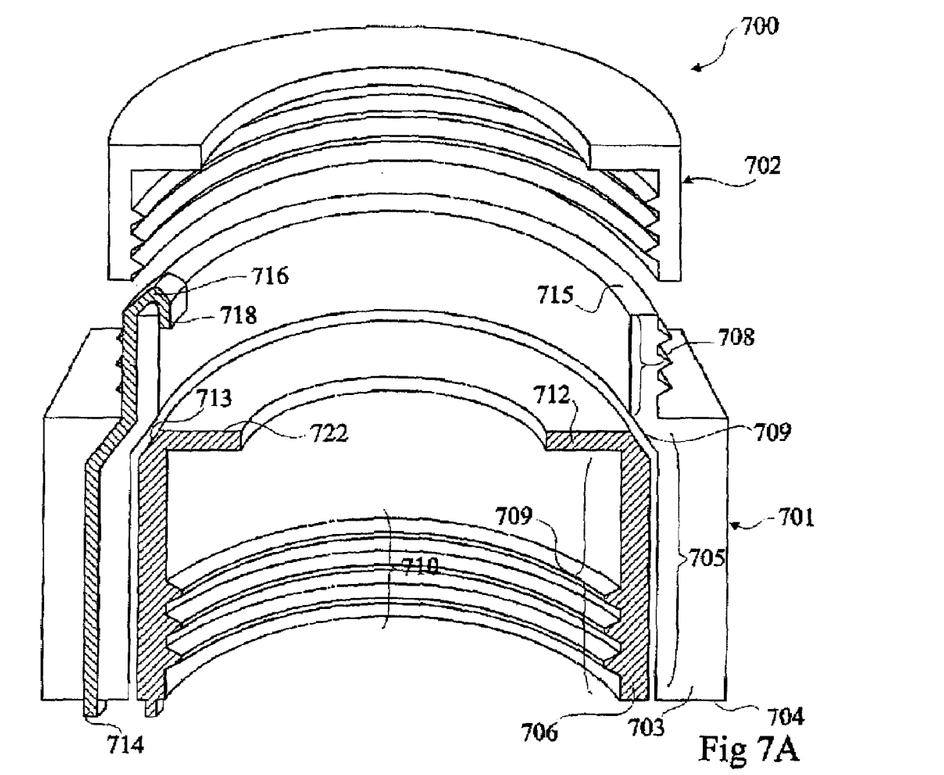
FIGS. 7A and 7B illustrate a lens housing according to a fifth embodiment of the invention.

FIG. 7A is a perspective view of a cross-section of a lens housing 700 according to a further embodiment. Lens housing 700 comprises a base 701 and a detachable lid 702. Base 701 comprises a wall 703 which is preferably substantially cylindrical in shape. Wall 703 is preferably formed of an insulating material such as a plastic or polymer material, and has a bottom edge 704 which can be mounted to a flat support or PCB not shown in FIG. 7A. A lower substantially cylindrical region 705 of the inner surface of wall 703 is arranged to receive an annular conducting track 706. An upper substantially cylindrical region 708 of the inner surface of wall 703 is arranged to receive a liquid lens (not shown in FIG. 7A). Region 708 has a slightly smaller diameter than region 705, and a bevelled surface 709 separates regions 705 and 708.

Annular conducting track 706 is for example machined or moulded in metal and comprises a substantially cylindrical portion 709 comprising an inner surface having a threaded region 710, allowing a lens module (not shown in FIG. 7A) to be screwed into position within the annular conducting track 706. Annular conducting track 706 further comprises a lip 712 protruding from the upper edge of cylindrical portion 709 towards the center of the housing, and providing a surface that both supports the underside of the variable focus lens when placed in position, and also contacts the underside of the annular foot of the variable focus lens, thereby making contact with the base electrode of the lens. A bevelled edge 713 is provided between a top surface 722 of lip 712 and an outer surface of the annular track 706, the bevelled edge 713 having substantially the same incline as bevelled surface 709 of wall 703, and lying adjacent to bevelled surface 709 when the annular track is in position. Bevelled edge 713 preferably contacts bevelled surface 709, thus holding the annular track in position.

An upper region adjacent to region 708 on the outer surface of wall 704 is threaded, such that removable lid 702 may be screwed into place. Lid 702 is a similar lid to lid 602 described above.

A second conducting track 714 is provided arranged to make contact with the metal cap of the liquid lens when placed in position in the lens housing 700. Track 714 is a narrow track extending from bottom edge 704 to the top edge of the housing 700. In the region adjacent to region 705 the track is positioned within the thickness of wall 703, thereby ensuring insulation of the track. The track emerges at the outer surface of the housing adjacent to region 708, and a groove is provide in the threaded region where the track 714 traverses this, such that it does not interfere with the screwing of the lid. At the top edge 715 of wall 703, the metal track comprises a bend 716 such that it curves inwardly towards the center of the housing, over edge 715, and a part 718 of track 714 extends a short distance down the inner surface of wall 703, in contact with region 708. Part 718 is arranged to make electrical contact with the cap electrode of the liquid lens.

Figure 7B:
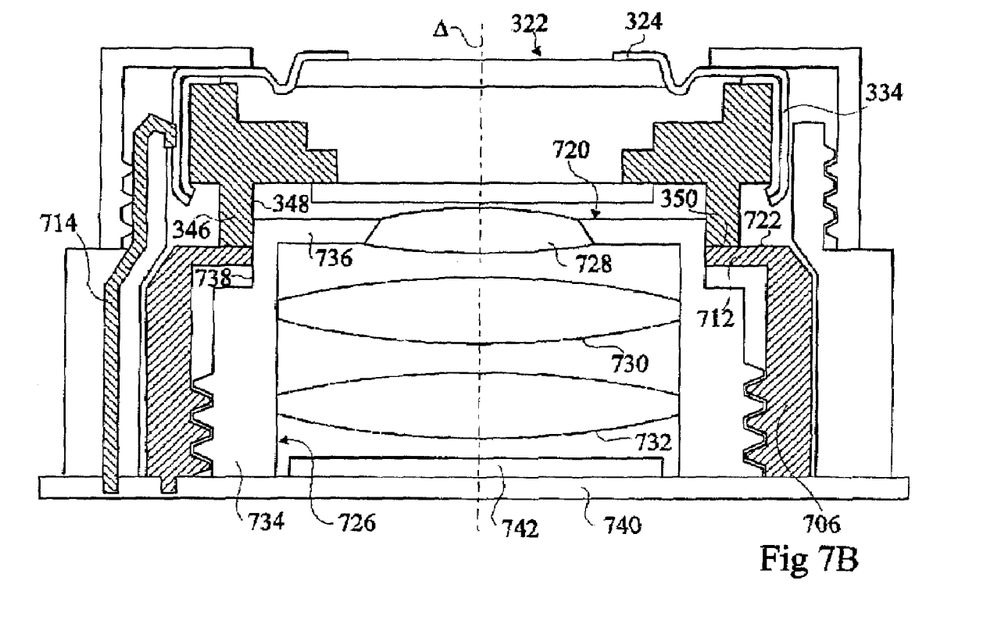

FIG. 7B is a cross-section view of the lens housing 700 with liquid lens 322 and a lens module 720 mounted in position therein. This cross-section is taken in plane comprising the axis of the lens housing, and passing through conducting track 714.

As shown, when lens 322 is placed in position, the top surface 722 of lip 712 of annular track 706 makes electrical contact with the underside 350 of annular foot 346 of the lens 322. Furthermore, part 718 is pushed against the exterior surface of side portion 334 of cap 324, making electrical contact therewith.

Lens module 720 is similar to lens modules 424 and 624 described above, and comprises a barrel 726 that houses fixed lenses 728, 730 and 732. In particular, barrel 726 comprises a substantially cylindrical portion 734 having an inner diameter approximately equal to the diameter of the fixed convex lenses 730, 732, such that these lenses fit tightly within. Lens module 720 also comprises an annular disc-shaped portion 736 having a circular opening receiving lens 728, the edges of the circular opening being inclined with respect to the optical axis of the lens. An outer annular edge 738 of cylindrical portion 734 facing out from the centre of the lens housing contacts the inner surface 348 of annular foot 346, thereby centering the lens module 720 with respect with the optical axis $\Delta$ of the liquid lens.

During assembly, the lens barrel 720 is preferably screwed into position within annular electrode 706, and then annular electrode 706 is glued or otherwise fixed on support or PCB 740, over an image sensor 742. In particular, a connection is formed, for example with solder, between the track 706 and vias or tracks on the PCB 740 connected to drive circuitry (not shown in FIG. 7B) that generates the required drive signals. Base portion 701 is then positioned over the annular electrode 706, and glued to the support 740. A connection is also formed between track 714 and vias or tracks on the PCB 740. Liquid lens 322 is then placed in position in the housing 700, in contact with annular track 706 and part 718 of track 714, and centered with lens module 720, and finally the lid 702 is screwed in place to hold the liquid lens 322, and the other lenses, in position.

In alternative embodiments, lid 702 could be formed of one part with base portion 701. In this case, liquid lens 322 is positioned on annular electrode 706 before the base portion is mounted, and then the base portion/lid combination 701/702 can be mounted to support 740 in one step to hold the liquid lens 322 in position.

Whilst not shown in FIG. 7B, the vertical positioning of the liquid lens 322 in the housing with respect to the image sensor 742 and the lens barrel 720 can be adjusted by inserting one or more conductive shims in between the underside of annular foot 350 and the top surface 722 of annular track 706. Similar adjustment could be performed in the embodiment of FIG. 6B by inserting an annular conductive shim contacting the underside 640 of the liquid lens 630. In both cases, the use of a threaded lid 602, 702 allows some variation in the length of the housing, and thus allows this adjustment to be made.

Thus embodiments of lens housings have been described having two or more conducting tracks for connecting electrodes of an electrowetting device to driving circuitry mounted on a support. The conducting tracks preferably extend a short distance into the support, such that they can be soldered in position to a conducting via on the support and thus connected to driving circuitry. The walls of the lens housing preferably comprise the conducting tracks integrated with the walls. In other words, the conducting tracks are fixed, for example with glued, to the walls, or formed as a coating on or within the walls. By providing conducting tracks integrated with walls of the lens housing, interference and also the required space for this connection can be reduced when compared to a standard flexible wire connection. Furthermore, by integrating the conducting tracks with the walls of the housing, the liquid lens can be free to rotate with respect to the housing. This is advantageous as it allows calibration of the rotational orientation of the lens to better align the lens with the optical axis of the lens system.

The electrodes of the electrowetting device are preferably arranged to be substantially rotationally symmetrical to the optical axis of the device, such that contact can be made with the electrodes when the device is at any angle of rotation. Alternatively, electrodes having only one point of contact could be provided. In this case the contact surfaces of the conducting tracks for contact with the electrodes preferably have rotational symmetry around the central axis of the lens housing such that the lens can be rotated about its optical axis, and electrical contact between the electrodes and the conducting tracks maintained. For example, conducting tracks 418, 420, 522, 524 and 706 are examples of conductive tracks having a contact surface with symmetry of rotation about the central axis of the housing.

Lens housings as described herein can be mounted on a support and incorporated in a variety of optical devices such as portable devices such as PDAs, mobile telephones having digital cameras, digital cameras etc.

Whilst a number of specific examples have been described, it will be apparent to those skilled in the art that there are many variations that could be applied. For example, whilst in the embodiments described the electrowetting device is a variable focus liquid lens, the principles of the invention could apply to alternative devices. Furthermore, the conducting tracks described in some embodiments herein are narrow tracks occupying a small area, and further conducting tracks could therefore be provided so that further electrowetting devices can be mounted in the lens housing. In particular, the arrangement of FIG. 5A could be expanded to be longer and comprise further tracks 514, 516 and respective annular contacts 522, 524, formed around the circumference of the housing 500 at different distances from the center of the lens. Thus a lens housing comprising two or more liquid lenses and/or a lens module comprising fixed lenses would be possible.

Whilst a number of examples of the formation of conducting metal tracks have been provided, alternatives are possible. For example, in some embodiments of the present invention the conducting tracks could be formed by a conductive glue, applied to a surface of the housing, or used to bond parts of the housing together. Such a conductive glue for example comprises a polymer that has electrical conducting characteristics once dry, or when pressure is applied to it.

A number of embodiments have been described in which a detachable lid is provided, screwed to the lens housing. In alternative embodiments a lid could be provided that is attached to the housing by other means, for example glued, or fixed in place by application of pressure causing friction between the lid and the body of the housing.

Having thus described at least one illustrative embodiment of the invention, various alterations, modifications and improvements will readily occur to those skilled in the art. Such alterations, modifications and improvements are intended to be within the scope of the invention. Accordingly, the foregoing description is by way of example only and is not intended to be limiting. The invention is limited only as defined in the following claims and the equivalent thereto.

The invention claimed is:

1. A lens housing comprising a wall comprising:
   a contact surface arranged for contact with a support;
   a first region for receiving an electrowetting optical device comprising a cavity containing first and second liquids, the curvature of an interface between said first and second liquids being controllable by electrowetting by application of a voltage between first and second electrodes of said device; and
   a second region for receiving one or more fixed lenses, the second region being positioned between said contact surface and said first region;
   wherein said lens housing further comprises first and second conducting tracks integrated with said wall, said conducting tracks extending between said contact surface and said first region, the first and second conducting tracks respectively comprising first and second conducting layers formed on a surface of said wall, and said conducting tracks being arranged to make electrical contact with respective ones of said first and second electrodes of said electrowetting optical device when said electrowetting optical device is positioned within said first region.

2. The lens housing of claim 1 wherein said electrowetting optical device, when positioned in said first region, is aligned with respect to said lens housing by contact between said conducting tracks and said first and second electrodes.

3. The lens housing of claim 1 wherein said first and second conducting tracks respectively further comprise first and second contacts arranged to provide an electrical connection between said conducting layer and said first and second electrodes respectively when said electrowetting optical device is positioned in said first region.

4. The lens housing of claim 3 wherein said first contact is arranged to form a lid, said first contact comprising a plurality of arms arranged to engage with corresponding brackets on said wall upon rotation of said first contact, thereby locking said electrowetting optical device in position in said housing.

5. The lens housing of claim 1 further comprising a lid comprising an opening for allowing light to enter the lens housing, and arranged to hold said electrowetting optical device in place when positioned in said first region.

6. The lens housing of claim 5 wherein said lid is detachable.

7. The lens housing of claim 1 wherein at least one of said first and second conducting tracks comprises a contact surface for contact with a respective one of said first and second electrodes, said contact surface having symmetry of revolution such that contact is maintained when said electrowetting optical device is rotated in said lens housing.

8. The lens housing of claim 1 wherein said first and second conductive tracks each comprise respective conductive surfaces arranged to make sliding contact with said first and second electrodes respectively such that said electrowetting optical device is rotatable about its optical axis when it is positioned in said first region.

9. A lens system comprising:
   a lens housing according to claim 1;
   said electrowetting optical device mounted within said housing; and
   at least one fixed lens mounted within said lens housing.

10. The lens system of claim 9 comprising a lens barrel housing said one or more fixed lenses, and wherein said electrowetting optical device and said lens barrel comprise first and second alignment surfaces respectively arranged to contact each other such that said lens barrel is aligned with said electrowetting optical device.

11. A lens system comprising:
    a lens housing:
    at least one fixed lens mounted within said lens housing;
    wherein said lens housing comprises a wall that comprises:
      a contact surface arranged for contact with a support;
      a first region for receiving an electrowetting optical device comprising a cavity containing first and second liquids, the curvature of an interface between said first and second liquids being controllable by electrowetting by application of a voltage between first and second electrodes of said device;
      a second region for receiving one or more fixed lenses, the second region being positioned between said contact surface and said first region;
      first and second conducting tracks integrated with said wall, said conducting tracks extending between said contact surface and said first region and arranged to make electrical contact with respective ones of said first and second electrodes of said electrowetting optical device when said electrowetting optical device is positioned within said first region;
    wherein said electrowetting optical device is mounted within said housing, and wherein said electrowetting optical device further comprises:
      an annular electrode comprising an annular foot, said annular foot comprising a surface having rotational symmetry about an optical axis of said variable focus liquid lens and arranged to make contact with said first conducting track, and
      a cap arranged to make contact with said second conducting track.

12. The lens system of claim 9 wherein said electrowetting optical device comprises an annular body and first and second transparent windows fixed to said annular body, said annular body comprising said first electrode of said variable lens.

13. The lens system of claim 9 wherein said electrowetting optical device is a variable focus liquid lens.

14. A camera module comprising:

a lens system mounted on a circuit board, wherein said lens system comprises:

a lens housing:

at least one fixed lens mounted within said lens housing;

wherein said lens housing comprising a wall that comprises:

a contact surface arranged for contact with a support;

a first region for receiving an electrowetting optical device comprising a cavity containing first and second liquids, the curvature of an interface between said first and second liquids being controllable by electrowetting by application of a voltage between first and second electrodes of said device;

a second region for receiving one or more fixed lenses, the second region being positioned between said contact surface and said first region; and     first and second conducting tracks integrated with said wall, said conducting tracks extending between said contact surface and said first region and arranged to make electrical contact with respective ones of said first and second electrodes of said electrowetting optical device when said electrowetting optical device is positioned within said first region;

wherein said electrowetting optical device is mounted within said lens housing; and wherein said camera module further comprises a drive circuitry mounted on said circuit board, connected to said first and second tracks and arranged to generate drive signals for driving said electrowetting optical device.

15. The camera module of claim 14 further comprising an image sensor mounted to said circuit board, said lens system being mounted over said image sensor in order to provide an image to said image sensor.

16. A mobile device comprising the camera module of claim 15.

17. A method of manufacturing an electrowetting optical device for mounting in a lens housing, the method comprising:

forming an annular electrode having an annular foot;

shielding a surface of said annular foot which is to contact a conducting track of the lens housing, wherein the lens housing comprises:

a wall that includes a contact surface arranged for contact with a support;

a first region for receiving an electrowetting optical device comprising a cavity containing first and second liquids, the curvature of an interface between said first and second liquids being controllable by electrowetting by application of a voltage between first and second electrodes of said device;

a second region for receiving one or more fixed lenses, the second region being positioned between said contact surface and said first region;

first and second conducting tracks integrated with said wall, said conducting tracks extending between said contact surface and said first region and arranged to make electrical contact with respective ones of said first and second electrodes of said electrowetting optical device when said electrowetting optical device is positioned within said first region; and     coating surfaces of said annular electrode, except for said shielded surface, with a layer of an insulating material.

18. The method of claim 17 wherein said shielding step comprising shielding the bottom surface of said annular electrode.

\* \* \* \* \*